United States Patent
Ohmi et al.

(10) Patent No.: US 7,258,725 B2
(45) Date of Patent: Aug. 21, 2007

(54) GAS SUPPLYING METHOD AND SYSTEM

(75) Inventors: Tadahiro Ohmi, Sendai (JP); Yoshio Ishihara, Tsuchiura (JP); Akihiro Nakamura, Kofu (JP)

(73) Assignee: Taiyo Nippon Sanso Corporation, Tokyo (JP)

( * ) Notice: Subject to any disclaimer, the term of this patent is extended or adjusted under 35 U.S.C. 154(b) by 409 days.

(21) Appl. No.: 10/497,311

(22) PCT Filed: Dec. 4, 2002

(86) PCT No.: PCT/JP02/12703

§ 371 (c)(1),
(2), (4) Date: Jun. 2, 2004

(87) PCT Pub. No.: WO03/047731

PCT Pub. Date: Dec. 6, 2003

(65) Prior Publication Data

US 2005/0109419 A1 May 26, 2005

(30) Foreign Application Priority Data

Dec. 4, 2001 (JP) .............................. 2001-369905

(51) Int. Cl.
*B01D 53/00* (2006.01)

(52) U.S. Cl. ...................... 95/41; 95/45; 95/47; 95/53; 95/54; 95/128; 95/131; 95/142; 95/149; 96/4; 96/7; 96/108

(58) Field of Classification Search .................... 95/41, 95/45, 47, 53, 54, 128, 131, 142, 149; 96/4, 96/7, 108
See application file for complete search history.

(56) References Cited

U.S. PATENT DOCUMENTS

| 3,922,150 | A | * | 11/1975 | Yusa et al. ..................... 95/96 |
| 4,400,183 | A | * | 8/1983 | Henrich et al. ................ 95/180 |
| 5,759,237 | A | * | 6/1998 | Li et al. ......................... 95/41 |
| 2006/0107831 | A1 | * | 5/2006 | Karwacki et al. ............. 95/116 |

FOREIGN PATENT DOCUMENTS

| EP | 0 983 791 A1 | 3/2000 |
| JP | 6-295870 | 10/1994 |
| JP | 9-251981 | 9/1997 |
| JP | 11-114360 | 4/1999 |
| JP | 11-157814 | 6/1999 |
| WO | 99/28023 | 6/1999 |

* cited by examiner

*Primary Examiner*—Minh-Chau T. Pham
(74) *Attorney, Agent, or Firm*—Nixon & Vanderhye P.C.

(57) ABSTRACT

Gas supplying method and system in which effective component gas in exhaust gas can be separated and purified efficiently to be resupplied regardless of variation in the flow rate or composition of the exhaust gas and consumed gas can be replenished efficiently. In a method for collecting exhaust gas discharged from a gas using facility, separating/purifying effective component gas contained in the exhaust gas and supplying the effective component gas thus obtained to the gas using facility, the exhaust gas discharged from the gas using facility is added with a replenishing gas of the same components as the effective component gas before the effective component gas is separated and purified.

5 Claims, 2 Drawing Sheets

GAS SUPPLYING METHOD AND SYSTEM

This application is the U.S. national phase of international application PCT/JP02/12703 filed in Japanese on Dec. 4, 2002, which designated the U.S. PCT/JP02/12703 claims priority to JP Application No. 2001-369905 filed Dec. 4 2001. The entire contents of these applications are incorporated herein by reference.

TECHNICAL FIELD

The present invention relates to methods and systems for supplying gases. In particular, the present invention relates to a method and a system for supplying a gas in which effective component gas contained in an exhaust gas discharged from a gas using facility is separated and purified and is resupplied to the gas using facility.

The present application is based on Japanese Patent Application No. 2001-369905, the contents of which are incorporated herein by reference.

BACKGROUND ART

In a process for manufacturing semiconductor products, such as semiconductor integrated circuits, liquid crystal panels, solar batteries and panels thereof, and magnetic discs, a system is widely used in which plasma is generated under an inert gas atmosphere and a semiconductor product is subjected to various treatments using the plasma. As an inert gas forming the inert gas atmosphere in such a plasma treatment, rare gases, such as krypton and xenon, have been recently used. Since krypton and xenon are quite expensive, these gases contained in an exhaust gas discharged from the above-mentioned gas using facility are usually recovered and purified until the impurity concentration is reduced to 100 ppm or less. Also, other than the rare gases used in the above-mentioned plasma treatment, it is desired that fluoride gases used for cleaning and/or etching, such as $NF_3$, $CF_4$, $C_2F_6$, $C_3F_8$, and $C_4F_8$, a semiconductor material processing gas, such as arsine and phosphine, and heavy hydrogen gas for annealing gas are recovered, without being directly discharged outside, and purified to be reutilized.

The above-mentioned rare gases and the semiconductor material processing gases (hereinafter referred to as effective component gases) are discharged from a gas using facility generally in a state mixed with nitrogen gas. Other than nitrogen, moisture, carbon monoxide, carbon dioxide, hydrogen, hydrocarbons, metal hydride gases, halogenated hydrocarbon gases, etc., may also be contained in exhaust gas in minute amounts as impurities or reaction byproducts which may be generated in association with processes carried out in the gas using facilities and so forth.

As methods for separating a gas component contained in a mixed gas, a low temperature liquefaction separation method, a pressure swing adsorption (PSA) method, temperature swing adsorption (TSA) method, a membrane separation method, and so forth are known. In these methods, however, since a system is designed in accordance with a predetermined flow rate and composition of a mixed gas, a predetermined flow rate and degree of purity of a targeted component gas to be recovered, and so forth, it is difficult to efficiently carry out the separation of a targeted component gas.

In the above-mentioned semiconductor product manufacturing process in which a plasma treatment is carried out, since an atmospheric gas, normally nitrogen gas, which maintains a clean atmosphere in a treatment chamber, is introduced into the treatment chamber, most of the gas discharged from the treatment chamber consists of the nitrogen gas.

Then, the gas introduced into the chamber is changed from the nitrogen gas to a plasma treatment inert gas, for example, a rare gas, such as krypton, so that the rare gas is introduced into the treatment chamber prior to carrying out the plasma treatment. After the rare gas atmosphere is generated in the treatment chamber, the plasma treatment is performed, and the atmosphere in the treatment chamber is returned to the nitrogen atmosphere by switching the gas introduced into the treatment chamber to the nitrogen gas after the plasma treatment. The components contained in the exhaust gas change from a nearly all-nitrogen gas state to a nearly all-rare gas state due to a gradual increase of a concentration of the rare gas, and after the plasma treatment, the concentration of the rare gas is gradually decreased to return to the nearly all-nitrogen gas state. Also, since a vacuum pump used for drawing exhaust gas from the treatment chamber is generally one in which nitrogen gas is passed through the bearings, a part of the nitrogen gas is mixed with the exhaust gas.

Accordingly, in the above-mentioned semiconductor product manufacturing process, most of the components of the gas discharged during carrying in and out of a substrate to the treatment chamber and a standby state of the treatment chamber is nitrogen gas whereas the gas discharged during the plasma treatment contains nitrogen and rare gases. That is, the concentration of rare gas in exhaust gas changes from time to time. Also, since the flow rate of nitrogen gas and rare gas which are introduced into the treatment chamber are not always the same, the flow rate of exhaust gas changes accordingly. Note that the pressure of each gas when it is discharged is usually at atmospheric pressure.

As described above, if a conventional PSA system is used to separate and purify a target gas, for example, effective component gas, such as a rare gas, from an exhaust gas whose flow rate and concentration change from time to time, problems such as significant lowering in purity of collected rare gas due to unstable operational state and uneven recovery rate of a rare gas may be caused since the amount of exhaust gas introduced and the amount of product gas collected vary.

Also, conventionally, a replenishing rare gas is generally introduced at a preceding step in the gas using facility in order to replenish rare gas which will be discharged and not recovered. In such a case, however, it is required to store a rare gas for replenishment in a storage container at a pressure of 0.4 MPa or more since it is necessary to replenish rare gas at a pressure of 0.4 MPa or more. Accordingly, there is a problem in that a large amount of rare gas is initially required, and hence, the amount of rare gas used will increase, increasing the effective gas cost.

DISCLOSURE OF THE INVENTION

An object of the present invention is to provide a gas supplying method and system in which effective component gas, such as a rare gas, contained in exhaust gas discharged from a semiconductor product manufacturing process, etc., can be separated and purified efficiently to be resupplied regardless of variation in the flow rate or composition of the exhaust gas and consumed gas can be replenished efficiently.

In order to achieve the above object, the gas supplying method according to the present invention is characterized in that, in a method for collecting exhaust gas discharged from a gas using facility, separating/purifying effective component gas contained in the exhaust gas and supplying the effective component gas thus obtained to the gas using facility, the exhaust gas discharged from the gas using facility is added with a replenishing gas of the same components as the effective component gas and then the effective component gas is separated and purified. In particular, the present invention is characterized in that the above-mentioned replenishing gas is added to the exhaust gas so that the component ratio of the gas to be separated and purified becomes constant.

Also, the gas supplying system according to the present invention is characterized by including an exhaust gas storage tank which collects and stores exhaust gas discharged from a gas using facility; a gas separation device which separates effective component gas contained in the exhaust gas; a gas introducing device which introduces gas in the exhaust gas storage tank into the gas separation device; a gas replenishing device which adds a replenishing gas having the same component as the effective component gas to the gas introduced into the gas separation device; a gas purifying device which removes impurities present in the effective component gas separated by the gas separation device; and a gas supplying device which supplies the effective component gas purified by the gas purifying device to the gas using facility.

Moreover, the gas supplying system according to the present invention is characterized in that the gas replenishing device is provided so as to add the replenishing gas into the exhaust gas storage tank, in that it further comprises a gas component detection device which detects components of gas introduced into the gas separation device, and in that the gas replenishing device includes a replenishing gas amount adjusting device which adjusts an adding amount of the replenishing gas based on a detection value detected by the gas component detection device.

BEST MODE FOR CARRYING OUT THE INVENTION

Figure 1:
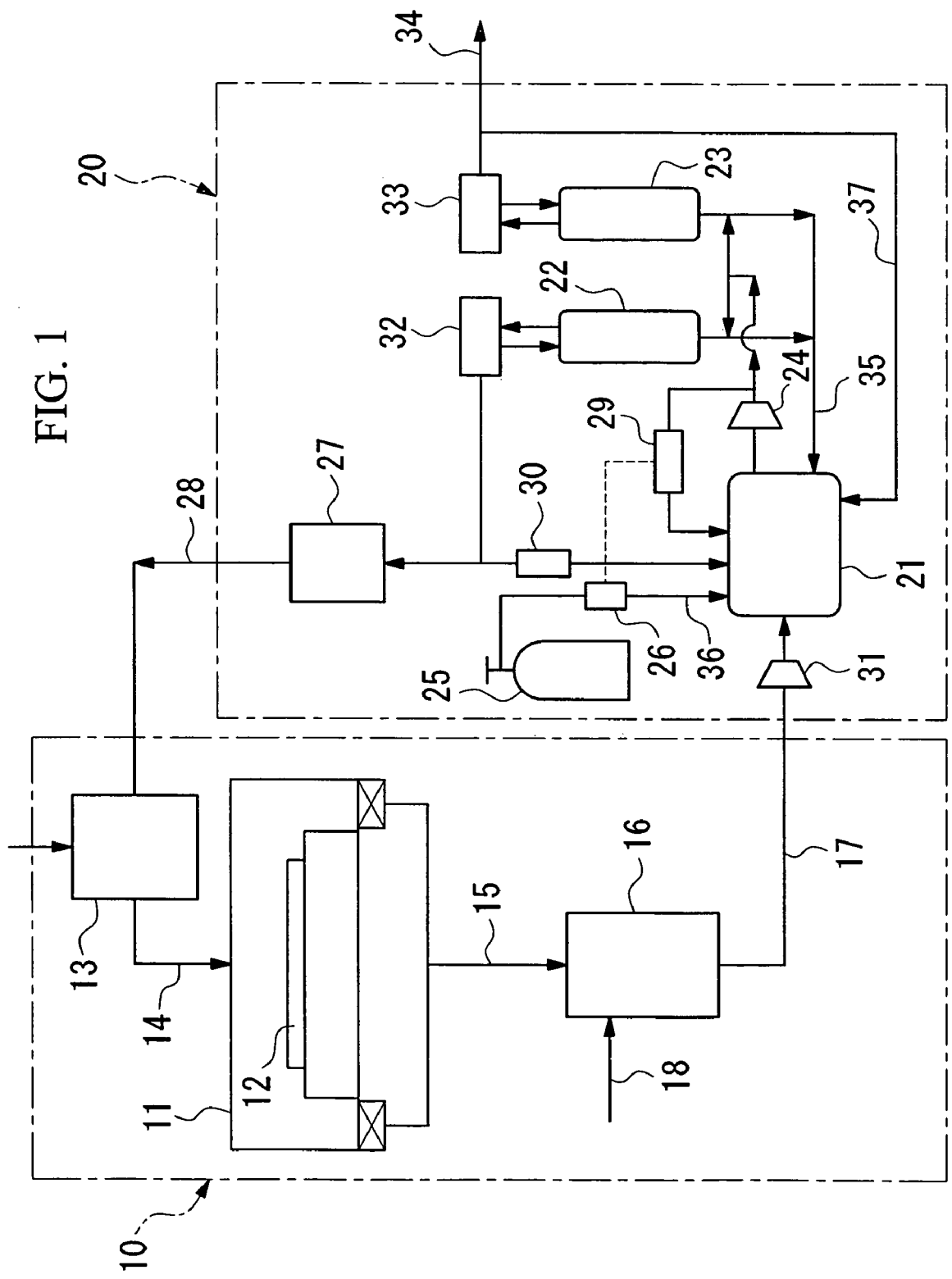
FIG. 1 is a schematic diagram showing an embodiment in which the present invention is applied to a plasma oxidation device.

FIG. 1 is a schematic diagram showing an embodiment in which the present invention is applied to a plasma oxidation device which is a gas using facility. In FIG. 1, an example in which a closed loop of rare gas is formed is shown by separating a rare gas, which is contained in exhaust gas discharged from the plasma oxidation device, from the other gases using a PSA (pressure swing adsorption) device, impurities contained are removed using a purifier, and the purified rare gas is resupplied to the plasma oxidation device.

A plasma oxidation device 10 carries out a plasma oxidation process for a substrate 12 placed in a treatment chamber 11 under a mixed gas atmosphere in which a few percent oxygen gas is added to rare gas, and a passage 14 for introducing gas which is supplied from a gas supply control unit 13 and a passage 15 for guiding exhaust gas are provided with the above-mentioned treatment chamber 11.

The exhaust gas from the treatment chamber 11 is drawn by a vacuum exhaust system 16, and is discharged to an exhaust gas recovery passage 17 from the vacuum exhaust system 16. Also, the vacuum exhaust system 16 is provided with a passage 18 through which a sealing gas for preventing incoming contaminants from atmospheric air and a reverse flow of the exhaust gas to the treatment chamber 11.

Note that argon, krypton, and xenon can be freely selected and used as a rare gas for a plasma oxidation process. Also, although any suitable gas which does not affect a manufacturing process can be used as an atmospheric gas for maintaining a clean atmosphere inside the treatment chamber 11 or as a sealing gas for the vacuum exhaust system 16, nitrogen gas is generally used for these purposes. Moreover, the pump used in the above-mentioned vacuum exhaust system 16 can be any pump which does not use oil, and a turbo-molecular pump, a dry pump, a screw pump, and a combination thereof can be suitably used.

A gas supplying system 20 which separates rare gas, such as krypton, contained in exhaust gas which is discharged to the exhaust gas recovery passage 17, from an atmospheric gas or sealing gas, such as nitrogen gas, and purifies it by removing contaminants to be resupplied, includes an exhaust gas storage tank 21, adsorption towers 22 and 23, a compressor 24, a krypton cylinder 25, a flow rate controller 26, a gas purifier 27, a gas supplying passage 28, a component detector 29, a contaminant concentration detector 30, an exhaust gas compressor 31, separated gas storage tanks 32 and 33, and an exhaust nitrogen discharging passage 34. The exhaust gas storage tank 21 stores exhaust gas. The adsorption towers 22 and 23 function as a gas separating means for separating krypton contained in exhaust gas by a PSA method. The compressor 24 functions as a gas introducing means for introducing gas inside the above-mentioned exhaust gas storage tank 21 into the adsorption towers 22 and 23. The krypton cylinder 25 and the flow rate controller 26 function as a gas replenishing means for adding replenishing krypton. The gas purifier 27 functions as a gas purifying means for removing impurities remained in krypton which is separated by the adsorption tower 22. The gas supplying passage 28 functions as a gas supplying means for supplying krypton, which is purified by the gas purifier 27, to the plasma oxidation device 10. The component detector 29 detects component ratio of a gas introduced into the adsorption towers 22 and 23. The contaminant concentration detector 30 functions as a means for detecting a concentration of contaminants in krypton which is separated by the adsorption tower 22. The exhaust gas compressor 31 transfers the exhaust gas in the exhaust gas recovery passage 17 to the exhaust gas storage tank 21. The separated gas storage tanks 32 and 33 store the separated gas introduced from the adsorption towers 22 and 23, respectively. The exhaust nitrogen discharging passage 34 is used to discharge exhaust nitrogen gas which is introduced into the separated gas storage tank 33 from the adsorption tower 23. Note that valves provided with passages for connecting each of the components are not shown in the figure and the explanation thereof is omitted.

The exhaust gas discharged to the exhaust gas recovery passage 17 from the plasma oxidation device 10 is transferred to the exhaust gas storage tank 21 by means of the exhaust gas compressor 31. To the exhaust gas storage tank 21, each of passages 35 through which regenerated exhaust gas from each of the adsorption towers 22 and 23 during a regeneration process is introduced, a passage 36 through which replenishing krypton from the krypton cylinder 25 is introduced, a passage 37 through which nitrogen gas from the exhaust nitrogen discharging passage 34 is introduced, and a passage through which exhaust gas from the component detector 29 and the contaminant concentration detector 30 is introduced is connected, and the exhaust gas which flows into the exhaust gas storage tank 21 is mixed with the various gases introduced through these passages.

Also, it becomes possible to introduce gas from each of the above-mentioned passages to the exhaust gas storage tank 21 without using a pump, etc., by making the volume of the exhaust gas storage tank 21 variable so that the inside pressure thereof can be always maintained to be closer to an atmospheric pressure. Although the volume of the exhaust gas storage tank 21 can be determined in accordance with the change in the flow rate or concentration of the exhaust gas which is introduced into the gas supplying system 20, the volume of the exhaust gas storage tank 21 is generally a volume which corresponds to an amount of exhaust gas which is introduced within a period of one hour.

The composition of gas inside the exhaust gas storage tank 21 is detected using the component detector 29, and the flow rate controller 26 is operated based on a detected value by the component detector 29 so that the gas composition, especially krypton concentration, in the exhaust gas storage tank 21 is maintained to be within a predetermined range by adjusting an adding amount of replenishing krypton. Also, it may be possible, in accordance with the variation in the gas composition in the exhaust gas storage tank 21, i.e., the gas composition of exhaust gas from the plasma oxidation device 10, to provide a flow controller, which is operated based on the detected value of the component detector 29, with the passage 37 so that the ratio of krypton with respect to nitrogen is controlled to be substantially constant by adjusting the amount of nitrogen which circulates to the exhaust gas storage tank 21.

Moreover, in addition to the above-mentioned control of gas composition based on a detected value, it is possible to maintain the state of gas inside the gas supplying system 20 to be substantially constant by inputting an hourly average value of krypton and nitrogen gas introduced into the plasma oxidation device 10, such as time corresponding to a process switching period of the adsorption towers 22 and 23, for example, 200 seconds, and a value which is obtained by dividing the total amount of krypton and nitrogen gas introduced into the plasma oxidation device 10 with the above time, into the gas supplying system 20 as information, and determining each of the flow rate of krypton supplied through the gas supplying passage 28 and the flow rate of exhaust nitrogen through the exhaust nitrogen discharging passage 34 based on the information so that balance is maintained between the gas introduced into the gas supplying system 20 and the gas discharged from the gas supplying system 20.

It is preferable that the flow rate controller 26 controls the mass flow rate while measuring a thermal conductivity of a gas. However, it is possible to use an automatic valve instead of the flow rate controller 26 since the pressure of krypton which is introduced from the krypton cylinder 25 may be adjusted to be low, for example, about 0.01 MPa (gauge pressure), by maintaining the pressure in the gas storage tank 21 to be about atmospheric pressure as mentioned above.

Also, although various gas analyzer may be used as the above-mentioned component detector 29 as long as it is capable of measuring the ratio of krypton and nitrogen gas, it is preferable to select one that can perform analysis in-situ and one that measures the change in flow rate using the difference in mass or that calculates the compositional ratio by using the specific heat may be employed. It is preferable to use one which determines the compositional ratio based on the flow rate against a certain resistance.

The gas whose composition is made uniform in the exhaust gas storage tank 21 is compressed by the compressor 24 until the pressure thereof reaches a predetermined operational pressure, and is introduced into the adsorption towers 22 and 23. Different adsorbent whose adsorbing property for rare gas, which is an effective component gas, is filled in the adsorption towers 22 and 23, respectively. That is, an adsorbent which hardly adsorbs rare gas and easily adsorbs most of the gas components other than rare gases, contained in exhaust gas, especially nitrogen gas which is often used for an atmospheric gas, a sealing gas, etc., is filled in the adsorption tower 22 (a first adsorption tower). Accordingly, rare gases which are hardly-adsorbed components and other hardly-adsorbed components contained in exhaust gas are discharged from an outlet end of the first adsorption tower 22. On the other hand, an adsorbent which easily adsorbs rare gas and hardly adsorbs most of the gas components other than rare gases, which are contained in exhaust gas, especially nitrogen gas, is filled in the adsorption tower 23 (a second adsorption tower). Accordingly, rare gases which are to be recovered can be adsorbed by the adsorbent to be retained in the adsorption tower, and the other gases are discharged from the second adsorption tower 23.

The adsorbents used for filling the adsorption towers 22 and 23 may be selected based on various conditions, such as the state of gas components contained in exhaust gas, i.e., types of effective gas components, kind of gas to be used as an atmospheric gas, etc., kind of impurities, and so forth. If the main components of exhaust gas are krypton and nitrogen gas as explained above, however, the absorbent used for the first adsorption tower 22 is most preferably zeolite 4A having excellent adsorbing property for nitrogen without adsorbing almost no krypton, and the absorbent used for the second adsorption tower 23 is most preferably activated carbon having excellent adsorbing property for krypton while adsorbing almost no nitrogen. Also, for the case in which moisture is contained in exhaust gas, it is possible to use a dehydrating agent, such as silica gel, in combination with these adsorbents.

In the adsorption towers 22 and 23, each component gas in exhaust gas is separated by opening and closing a plurality of valves provided with the towers using a predetermined procedure so as to repeat an adsorption process in which gas compressed by the compressor 24 and has a high pressure is introduced into the tower through an inlet thereof so that easily adsorbed component gases are adsorbed by the adsorbent and difficult-to-adsorb component gases are discharged through an outlet of the tower, and a regenerating process in which the pressure inside the tower is lowered by communicating the inlet of the tower to the exhaust gas storage tank 21 via the above-mentioned passage 35 and the components which have been adsorbed by the adsorbent are desorbed. Note that a purging operation in which a part of the separated gas in the separated gas storage tanks 32 and 33 is flowed in a reverse direction may be carried out at an end of the regenerating process. Also, it may be possible, depending on the relationship between the pressure inside the exhaust gas storage tank 21 and the pressure of the adsorption tower during the regenerating process, to draw regenerated exhaust gas using a vacuum pump so as to be transferred from the adsorption tower into the exhaust gas storage tank 21.

As explained above, the rate of recovering krypton may be improved because krypton remains in the first adsorption tower 22 and krypton desorbed from the adsorbents in the second adsorption tower 23 may be collected in the exhaust gas storage tank 21 by reintroducing regenerated exhaust gas from each of the adsorption tower via the passage 35 in the regenerating process.

The adsorbing process and the regenerating process carried out in the adsorption towers 22 and 23 may be adjusted so as to be independent of each other and these processes can be independently switched. However, by taking into account the operational state of the compressor 24 and the change in the amount of gas (or change in pressure) in the exhaust gas storage tank 21, it is preferable to determine the shape of the adsorption towers or the amount of adsorbents filled in the towers to adjust the process switching period so that one of the adsorption towers carries out the adsorbing process while the other one of the adsorption towers performs the regenerating process and the amount of gas from the exhaust gas storage tank 21 is leveled. Also, it is possible to provide a plurality of adsorption towers at each of the krypton adsorbing side and the nitrogen adsorbing side and assigning the adsorbing process and the regenerating process to each of the adsorption towers so that an adsorption-separation process can be continuously carried out by switching the process carried out in the plurality of towers.

A part of the separated gas including krypton as main component, which is discharged from the first adsorption tower 22 and stored in the separated gas storage tank (a first separated gas storage tank) 32, is introduced to the above-mentioned contaminant concentration detector 30, and the types and amount of contaminants contained in the separated gas is detected by the contaminant concentration detector 30. The contaminants contained in the separated gas may be hydrogen, carbon monoxide, etc., which are difficult-to-adsorb gas components, like krypton, for the adsorbent filled in the first adsorption tower 22, and nitrogen, oxygen, etc., which have not been completely adsorbed and removed.

Most of the separated gas in the first separated gas storage tank 32 is introduced into the gas purifier 27 where contaminants in the separated gas are removed and krypton is purified. Although various types of gas purifier 27 including adsorption type, membrane separation type, etc., may be used depending on kinds and amount of contaminants with respect to a main component of separated gas, krypton, in this case, a getter-type purifier using a metal, such as titanium, vanadium, zirconium, iron, nickel, etc., or an alloy may be suitably used.

Since the concentration of contaminants in the separated gas which is introduced into the gas purifier 27 is already measured by the above-mentioned contaminant concentration detector 30, the gas whose concentration of contaminants is already known is introduced into the gas purifier 27. It is possible to make an optimal design of a getter-type purifier depending on a required flow rate since the efficiency of removing contaminants usually depends on the concentration of contaminants at an inlet and the superficial velocity when a getter-type purifier is used. Also, the getter life may be calculated by disposing an integrated flowmeter at the gas purifier 27 or the gas supply passage 28 which in an outlet passage for the gas supply device 20, and hence, the timing for replacing the getter can be estimated. It is preferable, like for the above-mentioned component detector 29, to select one which can perform analysis in-situ as the contaminant concentration detector 30.

Krypton which is purified by the gas purifier 27 is supplied to the plasma oxidation device 10 via the gas supply passage 28, and is introduced into the treatment chamber 11 via the gas supply control unit 13 to be reutilized as an atmosphere forming gas for plasma treatment.

As explained above, the rate of recovering krypton can be significantly increased since the separation operation in the adsorption towers is performed in a stable state by adding krypton to exhaust gas discharged from the plasma oxidation device 10 in advance so as to maintain a constant ratio of krypton and nitrogen gas and then introducing the exhaust gas into the adsorption towers where these are separated. Also, the state of the separation operation in the adsorption tower may be more stabilized by temporary storing the exhaust gas in the exhaust gas storage tank 21 and maintaining the flow rate. Moreover, the recovery rate of krypton may be further improved by returning not only the regenerated exhaust gas in the adsorption tower but also the gas used for detection in the component detector 29 and the contaminant concentration detector 30 to the exhaust gas storage tank 21.

Although the optimal position for introducing the above-mentioned replenishing krypton is the exhaust gas storage tank 21 taking into account homogenization of gas components, the position can be arbitrary selected as long as the composition of gas introduced into the adsorption tower can be maintained constant. In particular, the addition of krypton can be efficiently carried out by selecting a portion at which the pressure is above the atmospheric pressure (i.e., tanks, pipes) as the introduction point for the replenishing krypton because the introduction of krypton from the krypton cylinder 25 can be carried out at low pressure. Examples of the preferable introduction point, other than the exhaust gas storage tank 21, include the exhaust gas recovery passage 17, the regenerating exhaust gas introducing passage 35, and the nitrogen gas introducing passage 37. Also, the position of the krypton cylinder 25 is preferably the inside of the gas supplying system 20 or in the vicinity thereof. In particular, the volume of pipes for supplying replenishing krypton can be minimized by placing the krypton cylinder 25 in the vicinity of the exhaust gas storage tank 21, and hence, the initial filling amount of krypton can be reduced.

Note that although the plasma oxidation device 10 and the gas supplying system 20 are placed so as to form a closed loop in this embodiment, it is possible to provide one or a plurality of gas supplying system for a plurality of plasma oxidation devices. Also, the plasma device which is a gas using facility that uses krypton (rare gas) is not limited to an oxidation device and can be an oxy-nitridation, a nitridation, or a reactive ion etching device. However, if active reaction products are contained in exhaust gas, it is necessary to provide a means for removing or separating these products from exhaust gas introduced into the gas supplying system 20.

Moreover, although a plasma oxidation device which uses krypton (rare gas) is employed as a gas using facility in this embodiment, the gas supplying system according to the present invention can be applied to various gas using facility as long as effective component gas contained in exhaust gas discharged from the gas using facilities can be separated from the other gas components. For example, as an effective component gas, fluoride gases used for cleaning and/or etching, such as $NF_3$, $CF_4$, $C_2F_6$, $C_3F_8$, and $C_4F_8$, a semiconductor material processing gas, such as arsine and phosphine, and heavy hydrogen gas for annealing gas can be efficiently separated and purified from exhaust gas containing these components to be resupplied to a gas using facility.

As a gas separating means, one which can separate effective component gas with respect to the composition of exhaust gas may be selected, and a temperature swing adsorption (TSA) method, a membrane separation method, and a low temperature liquefaction separation method may be used depending on the total amount of exhaust gas, the concentration of effective component gas in exhaust gas, purchase price of the effective component gas, and treatment cost thereof. Also, it is possible to include the above PSA device and suitably combine these. Moreover, although a case in which only krypton is an example of effective component gas in the above embodiment, it is possible to apply the present invention for a case where effective component gas used in a gas using facility is a mixed gas as long as the mixed gas can be separated from other unnecessary gases.

EXAMPLE 1

In a gas supplying system having a structure shown in FIG. 1, 6.5 kg of Zeolite 4A was filled in the first adsorption tower 22 having an inner diameter of 156 mm and a filling height of 500 mm, and 2 kg of activated carbon was filled in the second adsorption tower 23 having an inner diameter of 92 mm and a filling height of 700 mm. A volume variable tank having a maximum volume of 100 L and a minimum volume of 20 L was used as the exhaust gas storage tank 21. Exhaust gas was introduced into the gas supplying device at a rate of 1 L/min for both nitrogen gas and krypton. The gas introduced into the adsorption tower was compressed to about 0.4 MPa using the compressor 24, and was introduced into each of the adsorption towers at a flow rate of about 22 L/min. A separation operation based on the PSA method was carried out at a process switching period of 200 seconds. The flow rate of the first adsorption tower outlet gas (krypton) and the second adsorption tower outlet gas (nitrogen gas), respectively, was adjusted to be 1 L/min which was the same for the flow rate of the exhaust gas.

Figure 2:
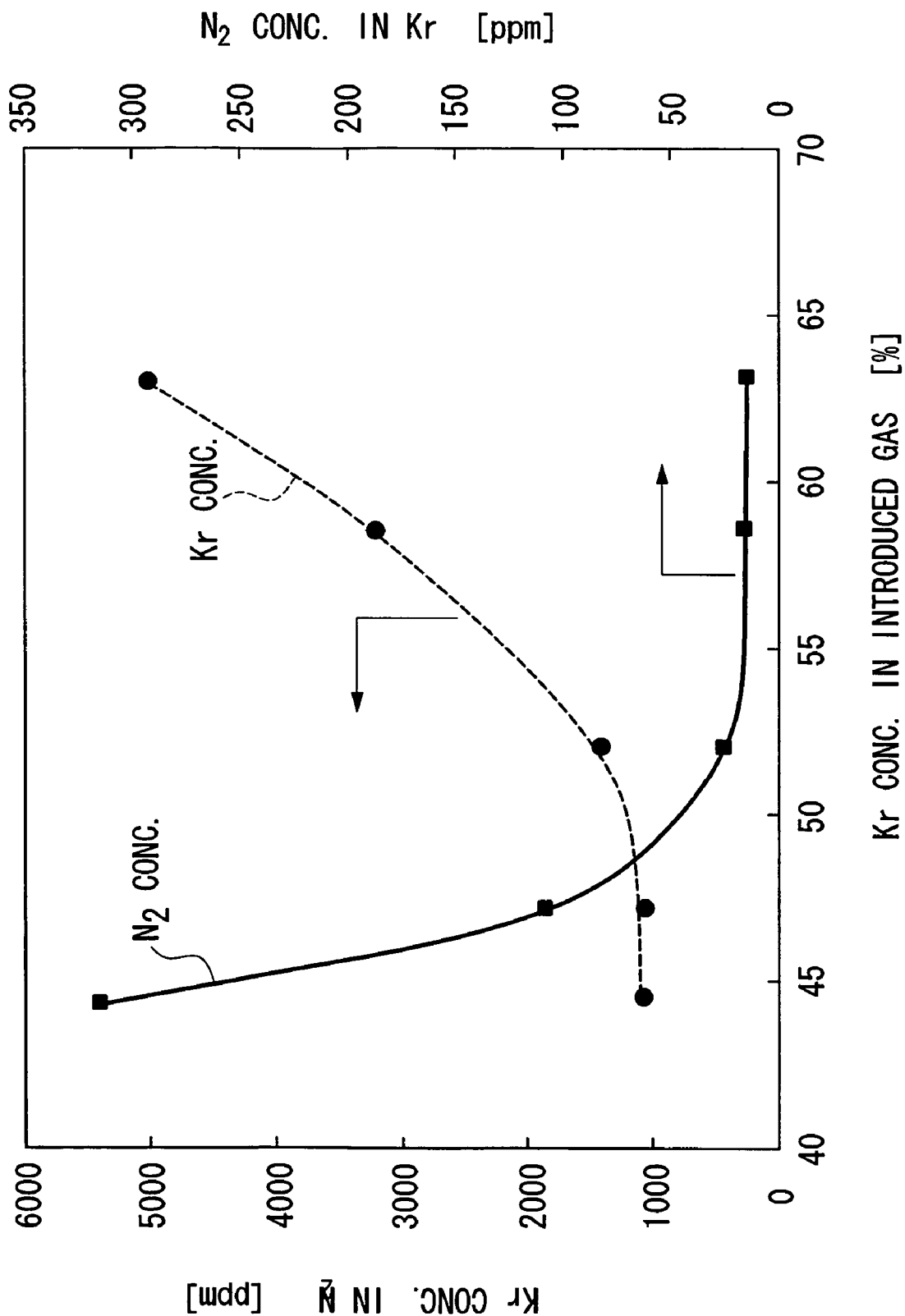
FIG. 2 is a graph showing a nitrogen gas concentration in krypton in gas at a first adsorption tower outlet and a krypton concentration in nitrogen gas in gas at a second adsorption tower outlet, respectively, with respect to a krypton concentration in nitrogen gas in Example 1.

The concentration of nitrogen gas in krypton at the first adsorption tower outlet gas and the concentration of krypton in the nitrogen gas at the second adsorption tower outlet gas, respectively, were measured using the above-mentioned state as a reference and varying the ratio of krypton and nitrogen gas in the introduced gas. The results are shown in FIG. 2. From the results, it is understood that the concentration of nitrogen gas in krypton at the first adsorption tower outlet gas can be suppressed to less than 100 ppm, and the concentration of krypton in the nitrogen gas at the second adsorption tower outlet gas can be suppressed to less than 5000 ppm by controlling the ratio of krypton in the gas introduced into the adsorption tower to be within the range of 47% to 63%.

EXAMPLE 2

The flow rate and composition of the exhaust gas introduced into the gas supplying system were varied using the same gas supplying system as in Example 1. First, after exhaust gas with a flow rate of nitrogen of 1 L/min and krypton of 350 cc/min was introduced and stored in the exhaust gas storage tank 21, it was introduced into the adsorption tower in the same manner as described above and a recovery operation for krypton was performed. At that time, the flow rate of krypton in the first adsorption tower outlet gas was about 350 cc/min and the ratio of krypton in the gas introduced into the adsorption tower was stable at about 49%.

After maintaining this state for about 5000 seconds, while maintaining the flow of nitrogen gas at 1 L/min, krypton was supplied for twenty minutes at a flow rate of 350 cc/min and then the supply of krypton was stopped for 10 minutes. This cycle of supplying krypton was repeated for nine times. After a time delay of about 600 seconds, the flow rate of the first adsorption tower outlet gas gradually reached 233 cc/min which was the average flow rate. At that time, although the concentration of nitrogen gas in krypton was increased to 65 ppm momentarily, it was decreased to 50 ppm in association with the lowering of the flow rate. Also, the ratio of krypton in the gas introduced into the adsorption tower was decreased to 48% momentarily and then increased to 50%.

EXAMPLE 3

The stability over a long period was confirmed using the same gas supplying system as in Example 1. The inside volume of the krypton cylinder 25 was 3.4 L, and 680 L (at atmospheric pressure) of krypton was filled therein. The flow controller 26 was operated to replenish krypton so that the ratio of krypton in the gas introduced into the adsorption tower measured by the component detector 29 became 55%. After about 1000 hours of continuous operation, the amount of consumed krypton was measured based on the decrease of pressure inside the krypton cylinder 25 and it was found to be about 123 L (converted to atmospheric pressure). Since the actual annual operation time in hours of the plasma oxidation device 10, which was calculated based on the average rate of operation, is about 5000 minutes, it is understood, by combining the above-mentioned gas supplying devices, that it is not necessary to replace the krypton cylinder for one year if a krypton cylinder having a volume of 3.4 L in which 680 L (converted to atmospheric pressure) is filled is provided for replenishing krypton.

INDUSTRIAL APPLICABILITY

As explained above, according to the present invention, since the separation operation for effective component gas is carried out after adding a replenishing gas, whose composition is the same as that of the effective component gas which is resupplied after collecting exhaust gas and being separated and purified, to the exhaust gas, it becomes possible to carry out the separation operation for the effective component gas in an efficient and stable manner. Accordingly, the replenishing amount of effective component gas may be reduced and the cost for gas can be reduced. Moreover, the cost for replacing the gas container, personnel expenses, etc., can be significantly reduced.

The invention claimed is:

1. A method for collecting exhaust gas discharged from a gas using facility, comprising the steps of:
   (1) collecting an exhaust gas discharged from a gas using facility into a gas storage tank, wherein the exhaust gas comprises an effective component gas, and an atmospheric gas or a sealing gas;
   (2) adding a replenishing gas of the same components as the effective component gas to the gas storage tank containing the exhaust gas discharged from the gas using facility, so that the component ratio of the gas to be separated and purified becomes constant;
   (3) separating the effective component gas contained in the exhaust gas from the atmospheric gas or the sealing gas;
   (4) purifying the effective component gas separated by the separating step; and
   (5) supplying the effective component gas thus obtained to the gas using facility.

2. A gas supplying system, using the method for collecting exhaust gas discharged from a gas using facility according to claim 1, comprising: an exhaust gas storage tank which collects and stores exhaust gas discharged from a gas using facility; a gas separation device which separates effective component gas contained in the exhaust gas; a gas introducing device which introduces gas in the exhaust gas storage tank into the gas separation device; a gas replenishing device which adds a replenishing gas having the same component as the effective component gas to the gas introduced into the gas separation device; a gas purifying device which removes impurities present in the effective component gas separated by the gas separation device; and a gas supplying device which supplies the effective component gas purified by the gas purifying device to the gas using facility.

3. A gas supplying system according to claim 2, wherein the gas replenishing device is provided so as to add the replenishing gas into the exhaust gas storage tank.

4. A gas supplying system according to claim 2, further comprising: a gas component detection device which detects components of gas introduced into the gas separation device.

5. A gas supplying system according to claim 4, wherein the gas replenishing device includes a replenishing gas amount adjusting device which adjusts an adding amount of the replenishing gas based on a detection value detected by the gas component detection device.

\* \* \* \* \*

UNITED STATES PATENT AND TRADEMARK OFFICE
CERTIFICATE OF CORRECTION

PATENT NO. : 7,258,725 B2  Page 1 of 1
APPLICATION NO. : 10/497311
DATED : August 21, 2007
INVENTOR(S) : T. Ohmi et al.

It is certified that error appears in the above-identified patent and that said Letters Patent is hereby corrected as shown below:

On the Title Page, Item (73) should read

--(73) Assignees:  Taiyo Nippon Sanso Corporation,

Tokyo (JP)

Ohmi, Tadahiro

Miyagi-ken (JP)--

Signed and Sealed this

Sixteenth Day of September, 2008

JON W. DUDAS
*Director of the United States Patent and Trademark Office*